Jan. 20, 1931. J. P. WALKER 1,789,717
OIL AND GAS SEPARATOR BAFFLE
Filed March 19, 1928
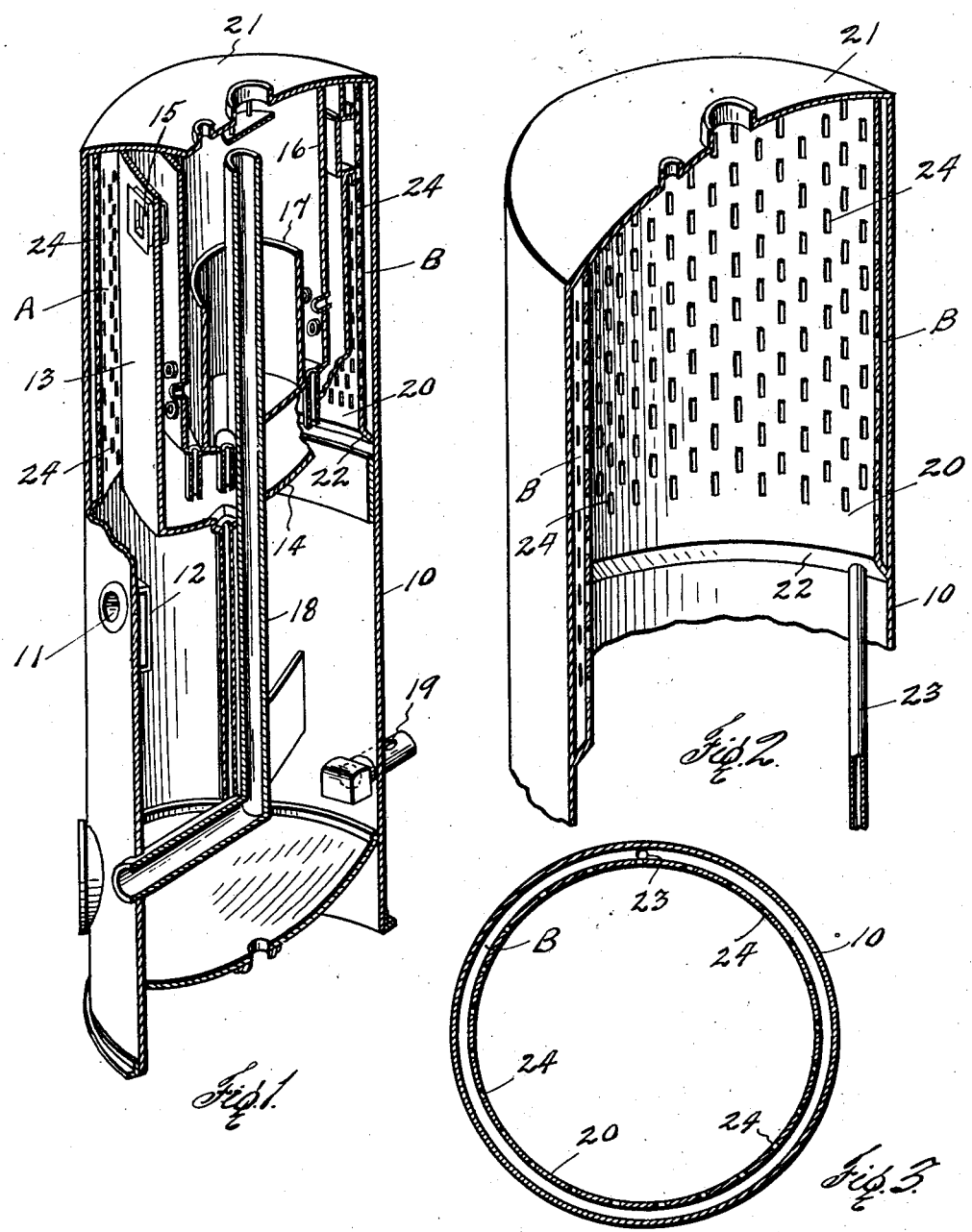

Patented Jan. 20, 1931

1,789,717

UNITED STATES PATENT OFFICE

JAY P. WALKER, OF TULSA, OKLAHOMA, ASSIGNOR OF FORTY PER CENT TO GUY O. MARCHANT AND SIX PER CENT TO C. G. WELLS, BOTH OF TULSA, OKLAHOMA

OIL AND GAS SEPARATOR BAFFLE

Application filed March 19, 1928. Serial No. 262,953.

This invention relates to new and useful improvements in oil and gas separator baffles.

One object of the invention is to provide a baffle within a separating channel arranged to collect and carry off the liquids contained in the mist rising in said channel.

A further object of the invention is to provide an upright slotted shell arranged in the path of the mist so as to permit the gaseous fluid to whirl and scrub out the heavier particles of liquid content.

A still further object of the invention is to provide a slotted shell spaced from but contiguous to the inner wall of the receptacle, whereby the gaseous fluids are forced through said slots and the heaviest of those of liquid content are thus trapped and drained from the chamber or space formed by said shell, while the lighter gaseous fluids are permitted to escape into the separator.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a partial vertical sectional view of an oil and gas separator equipped with a baffle constructed in accordance with my invention, Fig. 2 is a sectional detail of the baffle, and Fig. 3 is a horizontal cross-sectional view.

In the drawings the numeral 10 designates an upright tank having an inlet 11 for the oil and gas which is diverted circumferentially of the tank by a deflector 12. Concentrically within the tank is a shell 13 having a bottom 14 just above the deflector. The shell extends to the top of the tank and an annular vertical space or channel A is formed between the shell and the wall of the tank. Near the upper end of the shell inlets 15 are provided and within the shell concentric cylindrical separating elements 16 and 17 are arranged. A gas discharge pipe 18 leads from within the elements 16 and 17 centrally down through the tank and is directed outwardly through the wall of the tank at its lower portion. An oil outlet 19 leads from tne lower portion of the tank. The parts have been described in a general way for the reason that they form no particular part of the invention, the latter merely being used in conjunction therewith.

When the fluid enters the tank and is diverted circumferentially by the deflector 12, the liquids will, of course, flow by gravity downward and the gaseous vapors will flow upward. There will also be a mist which will rise in the channel A. The gaseous vapors and the mist will tend to seek the inlets 15 in order to escape, due to the pressure within the tank and the circulation set up through the pipe 18. It is desirable to extract as much liquid or oil as is possible before the fluids enter the inlets 15. Of course a certain proportion of the liquid particles will scrub out and collect on the outer wall of the shell 13 and on the inner wall of the tank, but ordinarily particles of liquid content to a large extent would be carried through the inlets 15.

In carrying out the invention I provide a cylindrical shell or baffle 20 of such diameter as to fit concentrically within the channel A adjacent the inner wall of the tank. The shell at its upper end is fastened to the top 21 of the tank and has an inwardly inclined flange 22 at its lower end contacting with the tank wall and forming a trough. A drain pipe 23 leads downwardly from said flange.

The shell is placed in such proximity to the inner wall of the tank as to form a narrow cylindrical chamber B. The flange 22 is located above or substantially at the level of the bottom 14 of the shell 13. The mist rising from the influent will pass up the channel A between the shells 13 and 20. The shell 20 is provided with a plurality of openings preferably in the form of short slots 24 disposed in staggered relation, but it is to be understood that the size, shape and disposition of these openings is subject to variation within the scope of the invention.

The rising fluid will more or less whirl in the channel A and the heavier particles of liquid content will cling to the surface of the shell 20 or will pass through the slots 22 into the chamber B. The lighter gaseous vapors will do likewise and after being scrubbed will again escape into the channel through the perforations. By this operation the uprising fluids will be robbed of a considerable portion of the liquid content which will collect in the chamber B and drain out through the pipe 23.

Where the influent enters the tank under a very high pressure there is a tendency for the particles of liquid content to be carried over to the pipe 18, because of the pressure within the tank and the rapidity with which the vapors travel. In view of this it will be seen that the shell or baffle 20 will materially reduce the liquid content of the vapors entering the inlets 15 and thus tend to recover a larger percentage of liquid. It is to be understood that the baffle may be used in any form of oil and gas separator where it is found advantageous and is not to be limited to use with the structure illustrated.

Various changes in the size and shape of the different parts, as well as modifications and alterations, may be made within the scope of the appended claims.

What I claim, is:

1. The combination with an oil and gas separator tank having an influent opening at mid-height and provided with an annular channel above said inlet and contiguous to the inner tank wall surface, of a baffle arranged in said channel and adjacent the inner wall surface and defining with said wall surface a chamber, said baffle having openings for admitting the gaseous fluids rising in said channel from the influent.

2. The combination with an oil and gas separator tank having an influent opening at mid-height and provided with an annular channel above said inlet and contiguous to the inner tank wall surface, of a baffle arranged in said channel and adjacent the inner wall surface and defining with said wall surface a chamber, said baffle having openings for admitting the gaseous fluids rising in said channel from the influent, the chamber being closed at its upper end and having a drain at its lower end.

3. The combination with an oil and gas separator tank having an influent opening at mid-height and provided with an annular channel above said inlet and contiguous to the inner tank wall surface, the channel having an outlet at its upper end, of an annular vertical baffle disposed concentrically of the wall surface of the tank within said channel and spaced a short distance from said wall surface to form an annular chamber, said chamber being closed at its upper end, said baffle having a plurality of spaced openings, an annular flange on the lower end of the baffle inclined to the wall surface of the tank to form a trough, and a drain pipe leading from the flange.

4. A baffle for the inner surface of the wall of an oil and gas separator, including a shell contiguous to the said surface and provided with a plurality of openings, said shell coacting with the tank surface to form a narrow, upright chamber, and the lower portion of the shell being imperforate and joining said wall to form a trough, and a drain leading from the trough and discharging within the tank.

5. A baffle for the inner surface of the wall of an oil and gas separator tank, including a cylindrical shell spaced from said surface to form a narrow chamber and having a plurality of openings, an annular flange inclined transversely from the bottom of the shell to the tank surface to form a trough, and a drain pipe depending from said trough.

6. The combination with an oil and gas separator tank having an influent opening, of a centrally disposed shell within the tank above said opening and having an inlet at the upper portion, a perforated baffle opposite said shell and spaced from the inner surface of the tank to form a narrow chamber closed at its lower end, and a drain from said chamber discharging within the tank below the influent opening.

In testimony whereof I affix my signature.
JAY P. WALKER.